United States Patent [19]

Moore

[11] Patent Number: 5,124,697
[45] Date of Patent: Jun. 23, 1992

[54] ACKNOWLEDGE-BACK PAGER

[75] Inventor: Morris Moore, N. Lauderdale, Fla.

[73] Assignee: Motorola, Inc., Schaumburg, Ill.

[21] Appl. No.: 422,826

[22] Filed: Oct. 16, 1989

[51] Int. Cl.$^5$ .................................................. H04Q 7/00
[52] U.S. Cl. ........................ 340/825.44; 340/825.52; 340/825.53; 340/825.54
[58] Field of Search ............ 340/825.44, 825.50, 340/825.52, 311.1, 825.51, 825.48, 825.54, 825.53; 379/57; 455/32, 54, 73, 89; 370/93, 94.1

[56] References Cited

U.S. PATENT DOCUMENTS

| | | | |
|---|---|---|---|
| 4,803,681 | 2/1989 | Takahashi | 340/825.5 |
| 4,811,379 | 3/1989 | Grandfield | 340/825.44 |
| 4,814,763 | 3/1989 | Nelson et al. | 340/825.48 |
| 4,875,038 | 10/1989 | Siwiak et al. | 340/825.44 |
| 4,914,649 | 4/1990 | Schwendeman et al. | 340/825.44 |
| 4,940,963 | 7/1990 | Gutman et al. | 379/57 |

Primary Examiner—Donald J. Yusko
Assistant Examiner—Peter S. Weissman
Attorney, Agent, or Firm—Gregg E. Rasor; Vincent B. Ingrassia; William E. Koch

[57] ABSTRACT

An acknowledge-back pager receives an address signal positioned within a group of address signals. Following reception of the address signal, first and second acknowledge signals are transmitted as determined at least in part by the received address signal's position in the group of address signals, such that, the first and second acknowledge signals are not simultaneously transmitted.

8 Claims, 4 Drawing Sheets

ACKNOWLEDGE-BACK PAGER

FIELD OF THE INVENTION

This invention relates generally to selective call receivers (e.g., pagers), and more particularly toward those pagers that acknowledge receipt of an address or message, (ack-back pagers), and is specifically directed toward a method for acknowledging receipt of a paging address and/or message.

BACKGROUND OF THE INVENTION

Acknowledge-Back (ack-back) pagers are those selective call receivers that transmit (automatically and/or manually) an acknowledge signal in response to receiving their selective call address or a message. These pagers provide the individual initiating the page a response indicating that the designated pager was in service and/or that the paging message has been received. To do this, the same channel used to carry the paging message may also be used as the acknowledge channel if paging through-put is not adversely affected. However, to maximize system effectiveness, acknowledge signals may be transmitted on one or more channels established within the paging system as acknowledge channels. This practice, in general, works well. However, once multiple acknowledge channels are established, it is possible for an ack-back pager to be paged in such a way as to be required to simultaneously acknowledge two or more messages. This, of course, is not possible in contemporary selective call receivers, and upon failure to properly respond to one of the messages, erroneous information may be automatically provided to the individual initiating the page. Accordingly, a need exists to provide multiple acknowledgements while avoiding pager and/or paging system operational conflicts.

SUMMARY OF THE INVENTION

Briefly, according to the invention, an acknowledge-back pager receives an address signal positioned within a group of address signals. Following reception of the address signal, first and second acknowledge signals are transmitted as determined at least in part by the received address signal's position in the group of address signals, such that, the first and second acknowledge signals are not simultaneously transmitted.

DETAILED DESCRIPTION OF THE INVENTION

Figure 1:
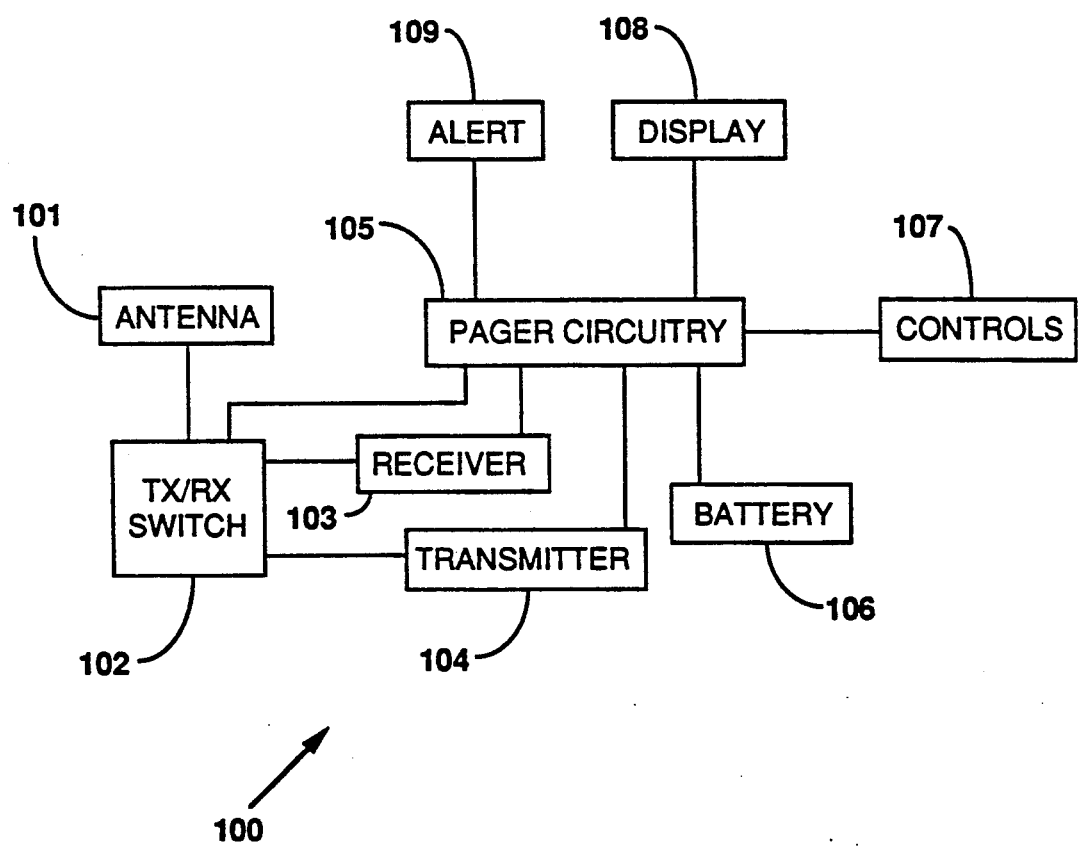
FIG. 1 is a block diagram of a selective call receiver in accordance with the present invention.

Referring to FIG. 1, a battery powered 106 selective call receiver 100 operates to receive a signal via an antenna 101. The received signal is routed via an TX/RX switch 102 to a receiver 103. The receiver 103 demodulates the received signals using conventional techniques and forwards the demodulated signal to pager circuitry 105, which decodes and recovers information contained within the received signal. In accordance with the recovered information and user controls 107, the selective call receiver 100 presents at least a portion of the information using a display 108 (or equivalent) and signals the user via a sensible alert 109 that a message has been received.

In the preferred embodiment of the present invention, the selective call receiver 100 comprises an acknowledge-back pager, which includes a transmitter 104 so as to transmit an acknowledge signal on one or more acknowledge channels. According to the invention, each acknowledge channel is divided into a plurality of time slots, each slot reserved for a signal acknowledging receipt of an address or message.

Figure 2:
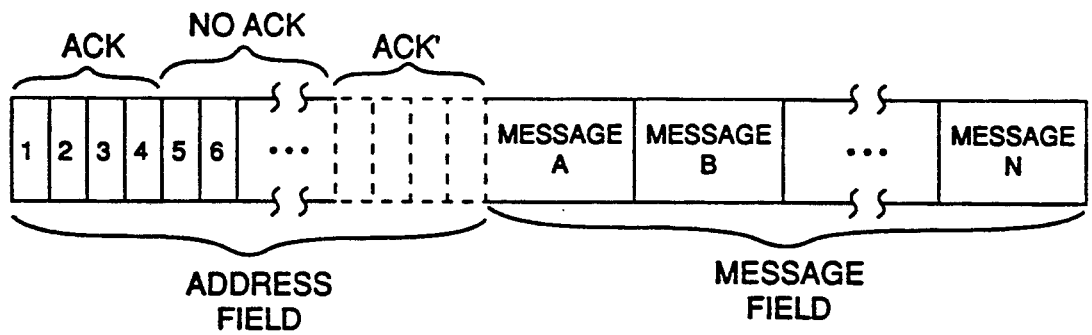
FIG. 2 is an illustration of the preferred address and message for according to the present invention.

Referring to FIG. 2, the preferred address/message format of the present invention is illustrated. As shown, an address field includes a group of address words, one or more of which may be used to address a particular selective call receiver. That is, depending upon the type of paging event, a single paging word may be used, or an extended (i.e., two or more address words may comprise portions of an address signal) address may be used. According to the invention, those pagers that must acknowledge receipt of their address signal are grouped in the front of the address field. Optionally, another acknowledge required group may be established at the end of the address field, leaving the middle section of the address field for those address signals that need not be acknowledged (if any). Moreover, the present invention contemplates that the acknowledge required groups may be reserved for various special types of pages or acknowledge signals. For example, the acknowledge required group positioned at the beginning of the address field may be reserved for tone only pages, while the acknowledge required group positioned at the end of the address field may be reserved for data (alphanumeric) pages.

Following the address field, messages for the addressed selective call receivers (except tone only pages that do not require additional information) are transmitted sequentially in a message field. Those skilled in the art will appreciate that the preferred format illustrated in FIG. 2 may be used in conjunction conventional synchronous or asynchronous paging protocols.

According to the invention, one or more address words are employed as an address signal to address a selective call receiver. These address signals are received from the group (or batch) of address words. As is known, the address words are queued by a paging terminal with the address word(s) for a particular pager having a calculable position in the batch of address words. Using at least the determined position of the selective call receiver's address in the group of addresses, an acknowledge signal is generated for each address word in accordance with the acknowledge procedure of the present invention.

Figure 3:
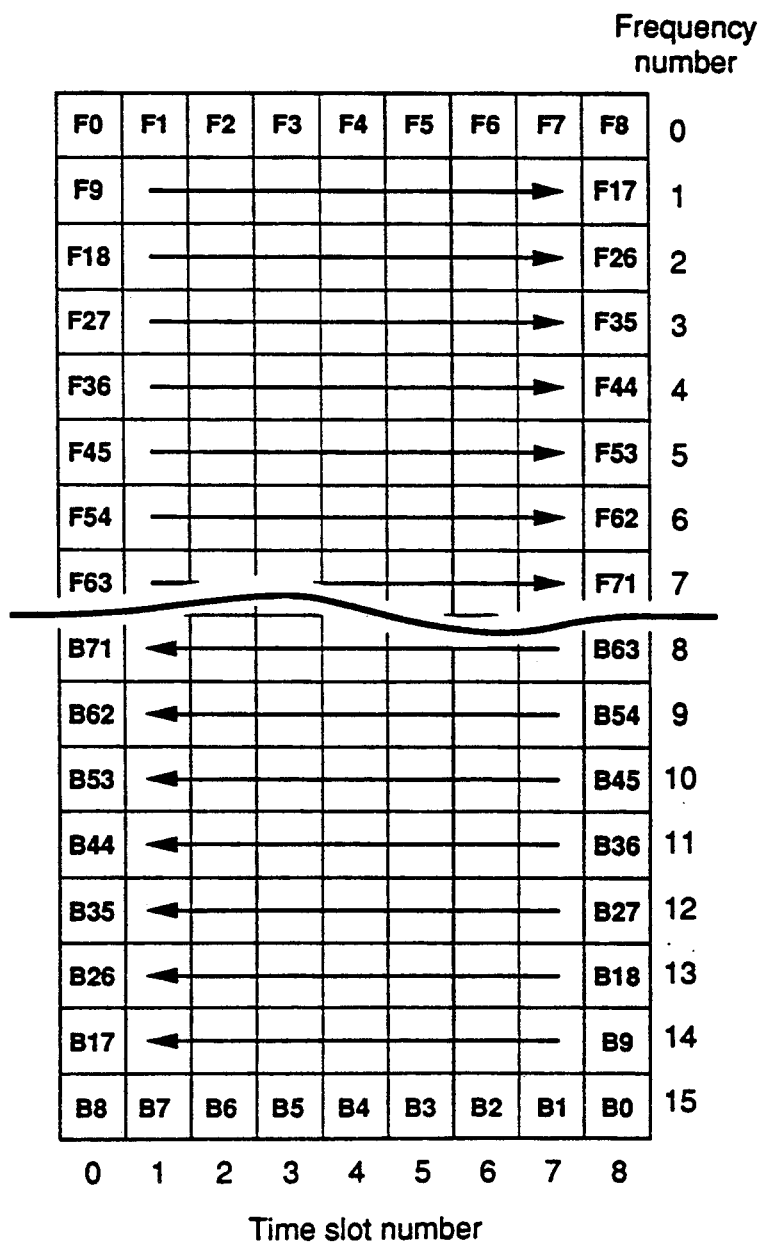
FIG. 3 is an illustration of the preferred address (or message) acknowledge protocol according to the present invention.

Referring to FIG. 3, a count-forward and count-back table is shown that illustrates how the present invention determines where and how to acknowledge address word(s). According to the invention, those addresses contained in the acknowledge required group of the address block (see FIG. 2) are forward counted (designated with a leading "F") from the beginning of the address block when determining the position of the address within the group of address. For example, if a pager's address comprises the ninth address word in the beginning acknowledge required group, the acknowledge signal would be expected on frequency one in time slot zero (i.e., F9 in FIG. 3). Alternately, if both the twenty-seventh and twenty-eighth address words are used as first and second portions of an extended address to activate a pager, two acknowledge signals would be expected on acknowledge frequency (channel) three; one in time slot zero and a second in time slot one.

A primary concern in multiple acknowledge channel paging system is the avoidance of having the pager being required to simultaneously acknowledge on different frequencies (i.e., time slot three on both channels two and four). This condition is avoided by the present invention's acknowledge rules illustrated in FIG. 3. Thus, if a dual word (or extended address) is used having positions forty-four and fouty-five, acknowledge signals would be expected on channel four, slot eight, and on channel five, slot zero. Thus, this procedure separates the acknowledge requirements for contiguous multiple word address so as to avoid having to transmit two or more acknowledge signals in corresponding time slot of different frequencies (or channels).

In the case where the acknowledge required address group is positioned at the end of the address field (as denoted by the ACK' field in FIG. 2), a mirror imaged count-back table is generated as shown in the bottom portion of FIG. 3. According to the invention, those addresses contained in the acknowledge required group of the address block (see the ACK' field in FIG. 2) are backward counted (designated with a leading "B") from the end of the address block when determining the position of the address within the group of address. This locates a particular acknowledge required address word in a position relative to the first count-back time slot (denoted as B0). In one embodiment, the position is determined by initializing the acknowledge required address counter for the first position to zero then incrementing the counter while proceeding from right to left in each row. When the last position of a row is reached, the row number is decremented by one (this action invokes a change in the acknowledge back channel designator and its corresponding frequency) and the acknowledge required address counter pointer is moved to the furthest right position in the new row. Alternately, if the total number of address words in the batch is known, the position may be calculated by counting the number of forward address words within the address field up to the pager's address word, then subtracting this count from the total number of address words in the address block.

Figure 4A:
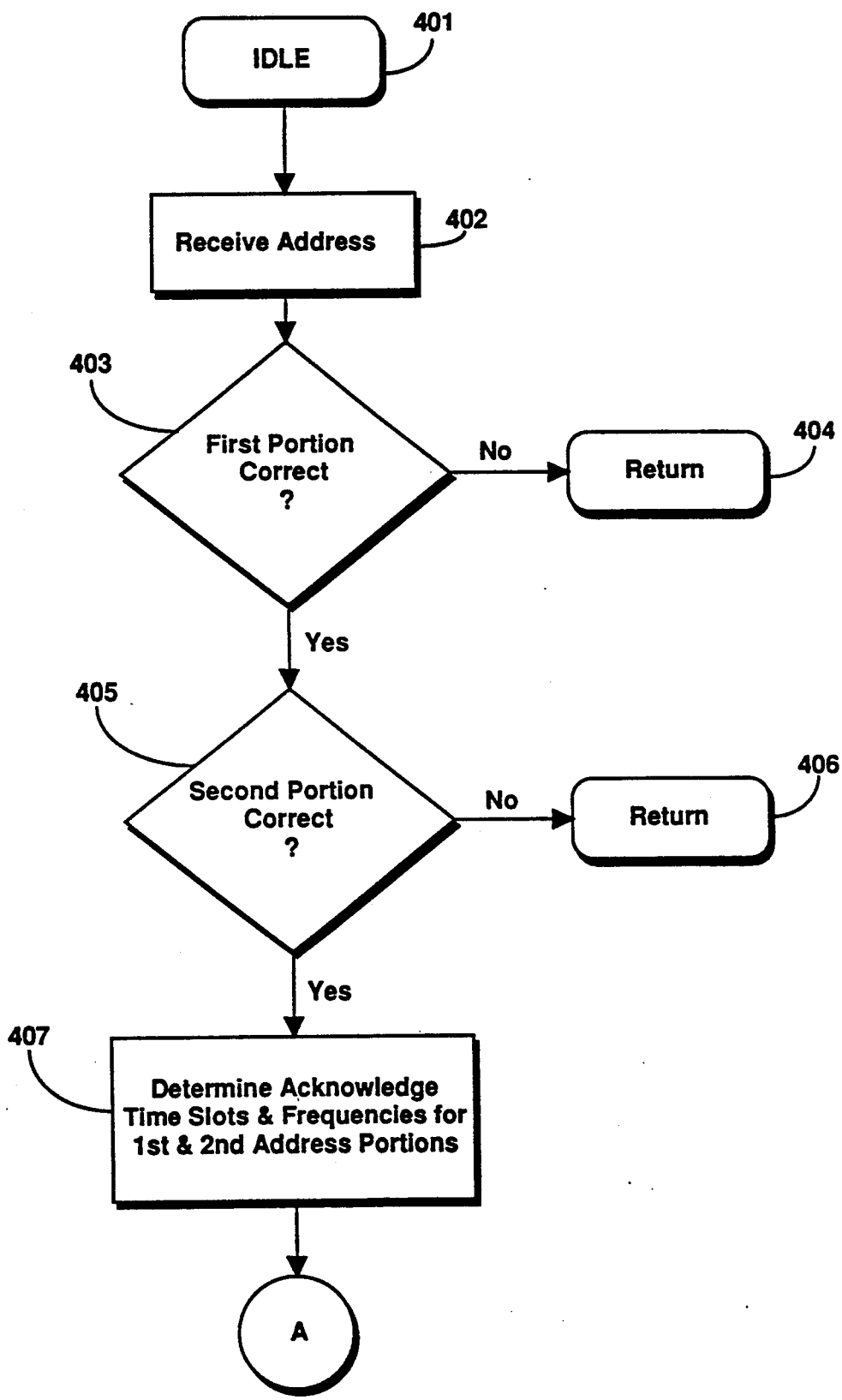
FIGS. 4a and 4b are flow diagrams illustrating the steps executed by the selective call receiver of FIG. 1 in accordance with the preferred acknowledge protocol of FIG. 3.

Referring to FIG. 4a, the pager waits in an idle state 401 searching for valid address words. When the pager receives a valid address 402, the first address word is compared to a predetermined first address word 403 associated with the pager. If the first address word received does not match the pager's first address word, the test fails and the pager returns 404 to the idle state to look for the next valid address word. When the first address word received matches the pager's first address word, the second address word received is compared to a predetermined second address word 405 associated with the pager. As in the case with the first address word, if the second address word received does not match the pager's second address word, the test fails and the pager returns 406 to the idle state to look for the next valid address word. When both the first and second address words received match the predetermined first and second address words associated with the pager, the acknowledge-back frequencies and time slots are determined for the first and second portions of the received address 407. The acknowledge-back frequencies and time slots determined are organized as shown in the table of FIG. 3. This organization provides for the maximum spacing in time when dealing with consecutive address word acknowledgements on different frequencies. A worst case scenario occurs when the first acknowledge response word falls in the last time slot of a frequency. In order to allow the maximum amount of time for frequency switching of the acknowledge transmitter, the algorithm used to generate FIG. 3 must place the second acknowledge response for a two word address on the next available frequency in the first time slot.

Figure 4B:
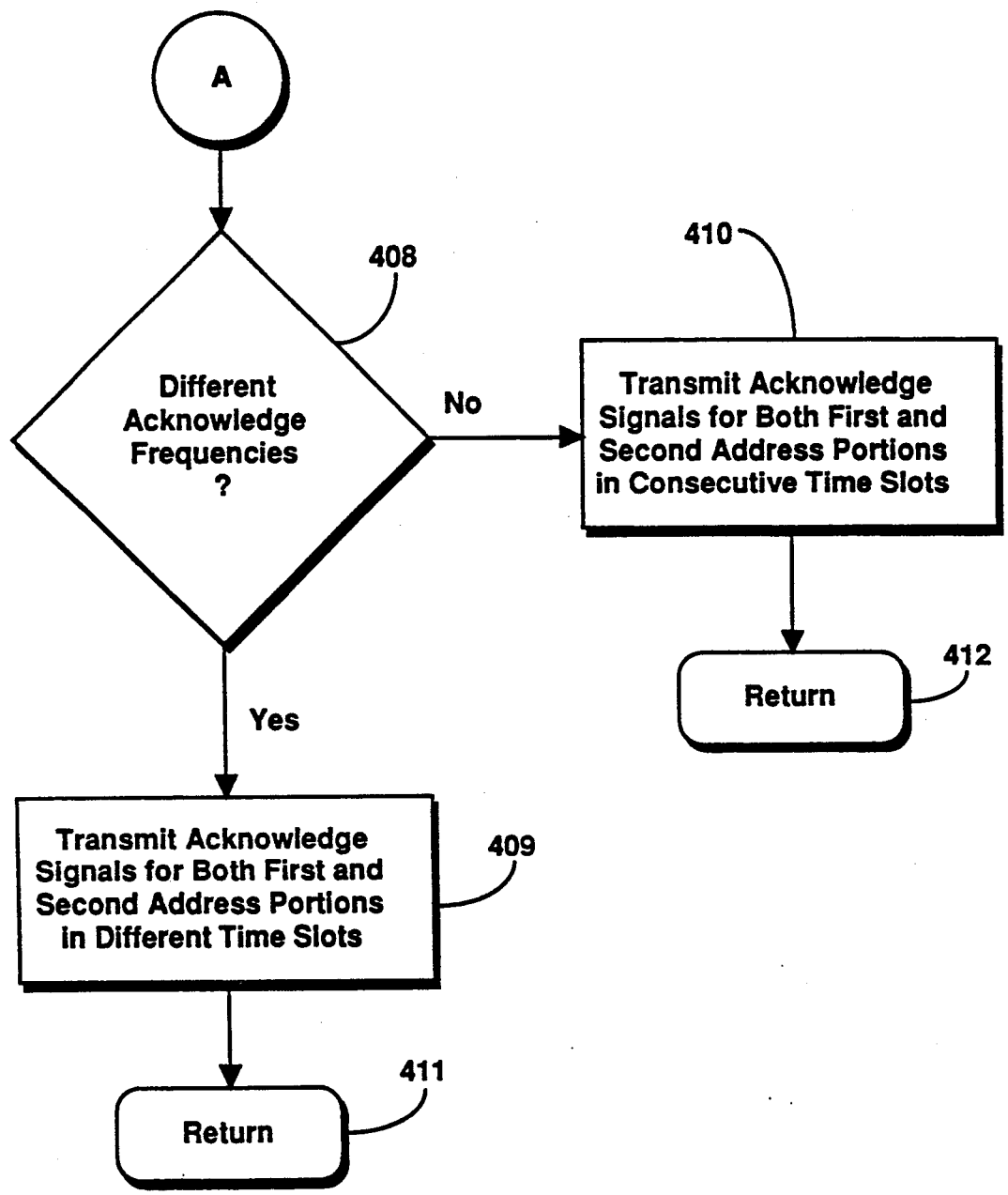

Referring to FIG. 4b, the previously determined acknowledge-back frequencies are compared to determine if the frequencies differ 408. If the acknowledge-back frequencies are different, the acknowledge-back responses are sent in their predetermined time slots on the different frequencies 409. This is required because an acknowledge-back pager having a single transmitter cannot simultaneously transmit on more than one frequency. If the acknowledge-back frequencies are the same, the acknowledge signals are transmitted in consecutive time slots 410. After the acknowledge signals are transmitted, the pager returns 411, 412 to the idle state 401.

I claim:

1. A method for acknowledging the reception of an address signal, comprising the steps of:
   (a) receiving an address signal positioned within a group of address signals to provide a received address signal; and
   (b) transmitting at least first and second acknowledge signals in first and second transmission time slots, respectively, the transmission time slots arranged such that a temporal relationship between the at least first and second acknowledge signals and the received address signal's position in the group of address signals is preserved while avoiding simultaneous conflicting transmission of the first and second acknowledge signals in a like time slot on different frequencies.

2. The method of claim 1 wherein step (a) comprises the step of receiving an address signal having a first and a second address word positioned within a group of address signals to provide a received address signal.

3. An acknowledge-back pager comprising:
   (a) receiving means for receiving an address signal positioned within a group of address signals to provide a received address signal; and
   (b) transmitting means for transmitting at least first and second acknowledge signals in first and second transmission time slots, respectively, the transmission time slots arranged such that a temporal relationship between the at least first and second acknowledge signals and the received address signal's position in the group of address signals is preserved while avoiding simultaneous conflicting transmission of the first and second acknowledge signals in a like time slot on different frequencies.

4. The acknowledge-back pager of claim 3 wherein the received address signal includes first and second address words.

5. The acknowledge-back pager of claim 4 wherein the first and second acknowledge signals respectively acknowledge correct reception of the first and second address words.

6. The acknowledge-back pager of claim 5 wherein the first and second acknowledge signals are transmitted by the transmitting means only after correct reception of both the first and second address words.

7. A method for acknowledging the reception of an address signal comprising the steps of:
   (a) receiving an address signal having a first and second portion to provide a received address signal, the address signal positioned within a group of address signals at least some of which have first and second portions; and
   (b) transmitting first and second acknowledge signals in first and second time slots, the transmission time slots arranged such that a temporal relationship between the at least first and second acknowledge signals and the received address signal's position in the group of address signals is preserved while avoiding simultaneous conflicting transmission of the first and second acknowledge signals in a like time slot on different frequencies.

8. An acknowledge-back pager comprising:
   (a) receiving means for receiving an address signal having a first and second portion to provide a received address signal, the address signal positioned within a group of address signals at least some of which have first and second portions; and
   (b) transmitting means for transmitting first and second acknowledge signals in first and second time slots, the transmission time slots arranged such that a temporal relationship between the at least first and second acknowledge signals and the received address signal's position in the group of address signals is preserved while avoiding simultaneous conflicting transmission of the first and second acknowledge signals in a like time slot on different frequencies.

* * * * *